Oct. 24, 1967  R. PAILLET  3,348,977
DRY CELL
Filed May 26, 1965  3 Sheets-Sheet 1
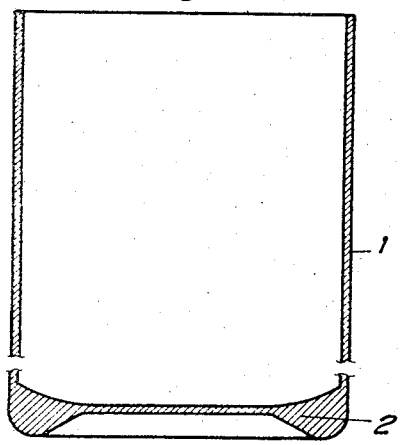
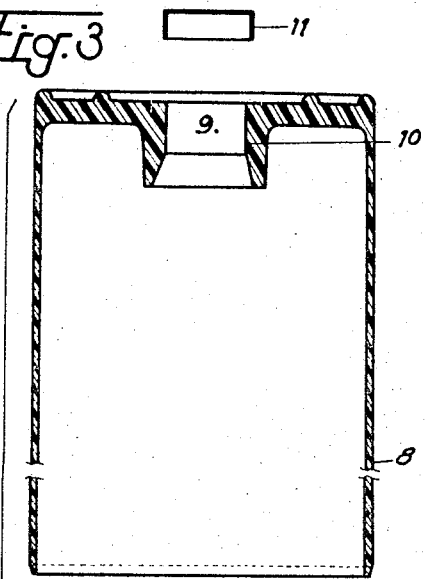
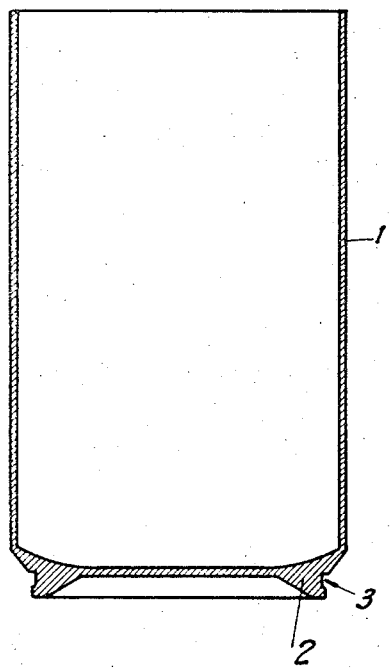
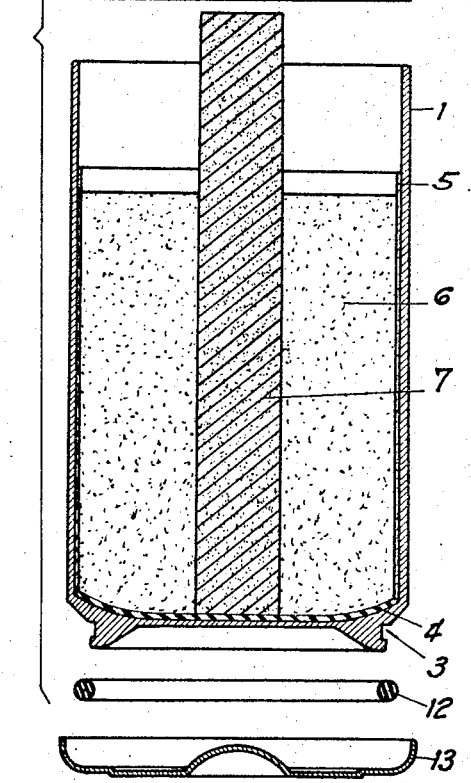
INVENTOR.
ROBERT PAILLET
BY
Woodhams, Blanchard and Flynn
ATTORNEYS Oct. 24, 1967     R. PAILLET     3,348,977
DRY CELL
Filed May 26, 1965     3 Sheets-Sheet 2
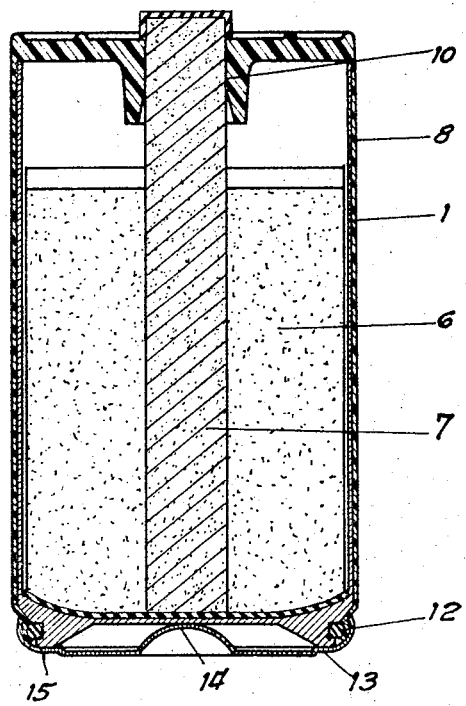
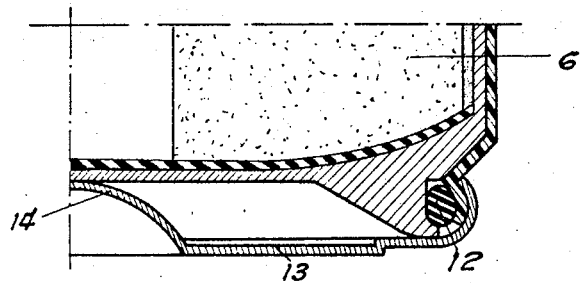
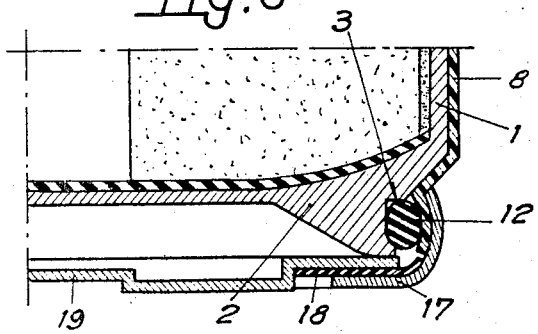
INVENTOR
ROBERT PAILLET
BY
ATTORNEYS Oct. 24, 1967  R. PAILLET  3,348,977
DRY CELL
Filed May 26, 1965  3 Sheets-Sheet 3
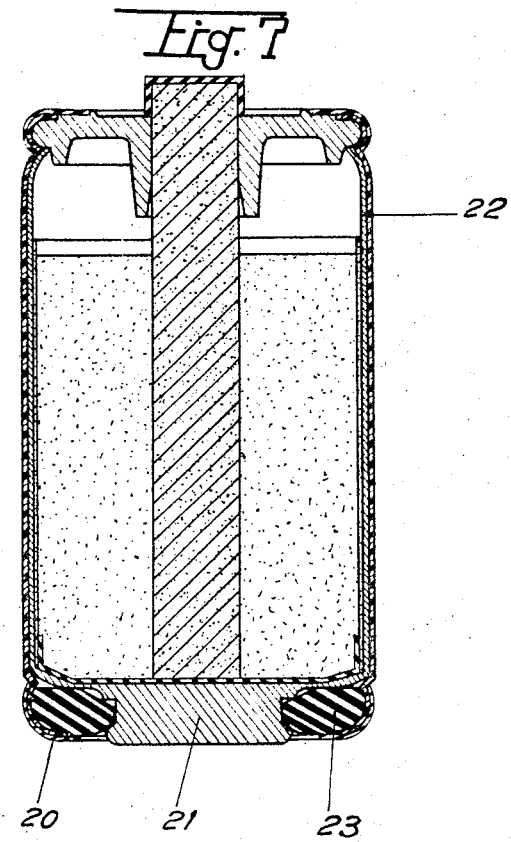
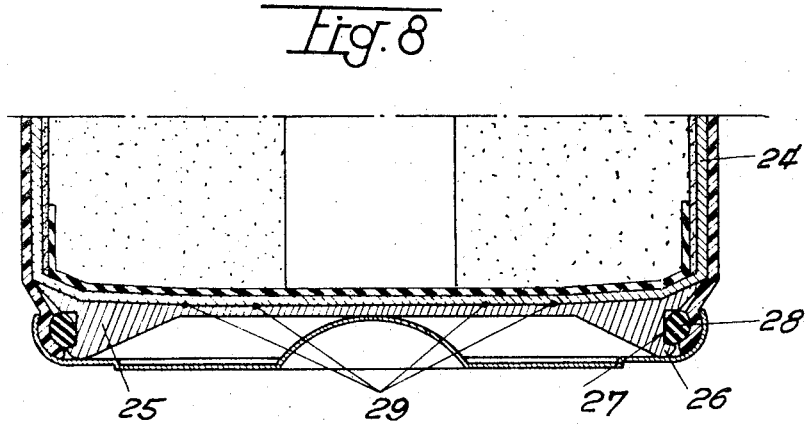
INVENTOR
ROBERT PAILLET
BY
Woodhams, Blanchard and Flynn
ATTORNEYS United States Patent Office 3,348,977
Patented Oct. 24, 1967

3,348,977
DRY CELL
Robert Paillet, Paris, France, assignor to Societe Les Piles Wonder, Saint-Ouen, France
Filed May 26, 1965, Ser. No. 459,037
Claims priority, application France, June 1, 1964, 976,643, Patent 1,405,923; Nov. 20, 1964, 995,716, Patent 1,423,094
10 Claims. (Cl. 136—133)

ABSTRACT OF THE DISCLOSURE

A dry cell is comprised of at least one primary electrochemical element of which the external member is a container. The dry cell is enclosed within a case of plastic material and the lower edge of the case is clamped at the bottom portion thereof between the raised edge of a cup and an O-ring seal which bears on the outer periphery of an overthickness formed on the base of the container.

The present invention has for its object a dry cell comprising at least one primary electrochemical element of which the external member is a container, said dry cell being enclosed within a case or jacket of plastic material and sealed at the top.

A large number of designs have already been proposed with a view to preventing any danger of leakage of electrolyte from dry cells by virtue of a number of different means which ensure effective leak-tightness at the level of the bottom of the element and therefore of the lower portion of the case of plastic material.

In particular, it has been proposed to castellate the bottom edge of the plastic case in order to fold said edge against the base of the element without forming an overthickness.

Leak-tightness at this level is then obtained by clamping the plastic material either between a metal ring and the base of the element or between a metal ring and a metal washer which is applied against the base of the element.

Designs of this type are not without drawbacks in view of the fact that, in order to be effective, they call for the use of parts which have to be manufactured to very close tolerances. This represents a very real difficulty, especially in the case of the element container.

Furthermore, however great the degree of flexibility of the plastic material employed, one cannot expect to obtain simply by compression a true leak-tight joint which is capable of withstanding the action of high internal pressures.

Finally, this mode of construction makes it impossible in practice to make use of the lower portion of the walls of the primary electrochemical element as soluble anode material since the metal ring which is intended to ensure leak-tightness by flattening or compression of the plastic material is applied against said lower portion.

It can in fact be readily understood that, if the lower portion of the wall of the element were to take part in the dissolving process which accompanies the flow of electric current, the clamping action produced by compression of the plastic material could not be maintained in its initial state and the risk of leakage of the electrolyte would consequently increase.

The object of the present invention is to obtain by simple and economic means a veritable sealing joint at the level of the lower portion of the plastic case, said sealing joint being intended to be capable of withstanding high internal pressures with constant effectiveness irrespective of the conditions either of storage or utilization of the dry cell considered.

With this object in view, a dry cell in accordance with the invention is essentially characterized in that the case is clamped at the bottom portion thereof between the raised edge of a cup and an O-ring seal which bears on the outer periphery of an overthickness formed on the base of the container.

In a preferred form of embodiment of the invention, the O-ring seal is placed within a channel which is formed in the outer periphery of the overthickness and which can be of trapezoidal cross-section.

As an advantageous feature, the container and the overthickness are formed in one piece by extrusion and the channel is then machined in the overthickness.

According to an alternative form, the overthickness forms part of a separate metallic member which can be joined to the base of the container by spot welding.

It will be apparent that, by virtue of the arrangements hereinabove set forth, the sealing joint or O-ring seal is sufficiently flattened by compression between the walls of the channel formed in the overthickness and the bottom portion of the plastic case to ensure the requisite leak-tightness by virtue of the elasticity of said seal as soon as the top portion of the raised edge of the cup is folded down inwardly as a result of a simple operation which is comparable with a crimping process. In addition, the cup cannot in any event be pulled free even if high internal pressures are developed within the cell and communicate within the space formed between the container and the case. Finally, the manufacture of the different components of the dry cell does not entail any difficulty which is liable to have any influence on the cost price.

However, it will be noted that it is necessary either to provide an electric contact between the cup and the container or to make it possible by other means at the base of the cell to form one of the current-supply terminals.

It is in order to provide the aforesaid electric contact that, in a particularly simple mode of construction, the cup is applied against the overthickness and is also usefully provided with an inwardly projecting dome which is applied against the base of the container.

However, in the case of certain applications, it can prove useful to ensure that no electronic bond can be established between the terminal of the negative pole of the cell and any other metallic part of a utilization apparatus which is in contact with the side walls of the cell.

For this purpose, a first solution consists in providing, for example by means of varnish, an insulation of the exterior of the raised edge of the metal cup.

However, in accordance with an arrangement which comes within the scope of the invention, the cup can have extensive open portions and be insulated by interposition of a washer from a disc which bears on the overthickness. Thus, the disc referred-to constitutes the current-supply terminal.

In accordance with an alternative form, the cup can comprise extensive open portions and only be in contact with the case and the O-ring seal, the height of the overthickness being sufficient to reach at least the level of the open portion of the cup. In this case, the overthickness itself constitutes the current-supply terminal.

The invention will in any case be readily understood by consideration of the description which follows below, reference being made to the accompanying drawings which show by way of nonlimitative example a certain number of forms of embodiment of the invention, and in which:

FIG. 1 is a sectional view of a primary electrochemical element in the form of a container, as shown in a first stage of manufacture;

FIG. 2 represents the same element in a second stage of manufacture;

FIG. 3 is an exploded sectional view of all the components of a dry cell in accordance with the invention;

FIG. 4 is a sectional view of the dry cell after assembly;

FIG. 5 is a part-sectional view on a larger scale of the dry cell in accordance with FIG. 4;

FIGS. 6 to 8 are further alternative forms of the dry cell of FIG. 4.

Referring first to FIG. 1, there can be seen a metal container 1 which is preferably formed of zinc.

In accordance with the invention, an overthickness 2 has been formed at the base of said container and at the peripheral portion thereof. For the sake of ease of manufacture at the time of extrusion of said container, the external diameter of the overthickness is the same as the diameter of the container proper, but it should be noted that it would not constitute a departure from the scope of the invention to provide a diameter of overthickness which is smaller than that of the container.

It should also be emphasized that the overthickness 2 can very easily be formed at the same time as the extrusion of the container from a zinc disc. In fact, it has even been proved by experience that this method results in a lesser degree of wear of the extrusion tooling compared with the wear which is noted when producing ordinary containers.

FIG. 2 shows that there has been machined on the outer periphery of the overthickness 2 a circular channel 3 having a trapezoidal cross-section and a depth of a few millimeters.

FIG. 3 shows that the container 1 which serves as the soluble anode material of the cell is provided at the bottom with an insulating member 4, then with electrolyte 5, and also its support 5, then the depolarizing mixture 6 which is packed around a central electrode 7 which consists, for example, of a carbon pencil.

There is then placed over said element a case 8 of generally cylindrical shape and formed of flexible plastic material such as polyethylene, polypropylene or vinyl chloride, said case being intended on the one hand to seal off the open top of the cell and, on the other hand, to enclose the side walls of the zinc container 1. Said case is provided in known manner with an opening 9 having a diameter which is slightly smaller than that of the central electrode 7 which is intended to be inserted therethrough, said opening being provided with an appendage 10 for the purpose of increasing the depth of passage through the case. After fitting the case in position, the assembly is completed by a metal cap 11 of brass, for example, which is adapted to cover the central electrode.

These different components are completed in accordance with the invention by an O-ring seal 12 formed of rubber or any suitable inert and flexible material. Said O-ring seal has a cross-sectional configuration which is preferably toric and is of such dimensions that said seal fits tightly within the circular channel 3.

Finally, there is shown beneath the O-ring seal at 13 a stamped cup of thin metal, for example of tinned iron. Said cup, which will be described in detail in reference to FIG. 4 has a slightly larger diameter than that of the case 8 of plastic material.

FIGS. 4 and 5 show the manner in which the bottom portion of the case is covered by the metal cup 13 after the components 1 to 12 have been fitted in position, said bottom portion of the case being located slightly below the level of the O-ring seal 12 when the case itself finally abuts against the top edge of the zinc container.

A crimping operation is then performed on the metallic edge of the cup 13 which is applied against the overthickness 2 and, finally, the O-ring seal is compressed under substantial pressure against the circular bottom of the channel on the one hand and against the case 8 on the other hand.

As will accordingly be apparent, it is practically impossible, irrespective of the pressure applied, to pull away the cup 13 which is retained by the O-ring seal 12 which is in abutment against the inclined outer wall of the channel 3.

Moreover, in the event of abnormal utilization of the cell, and if the electrolyte tends to discharge from the container, said electrolyte can fill the free portion located above the cathode and even flow out between the container 1 and the case 8.

However, the electrolyte will encounter the O-ring seal 12 at the bottom of the case and thus will effectively be prevented from passing through inasmuch as the seal ensures complete leak-tightness. Consequently, no liquid can escape from the case under any circumstances, the worst foreseeable occurrence being a slight deformation of the case 8.

It should be pointed out in this connection that leak-tightness is ensured at the top of the cell by virtue of the appendage 10 which clamps the central electrode 7 in position.

Finally, it is important to observe that the zinc container can be employed as primary element up to its full height and that the effectiveness of the O-ring esal 12 cannot thereby be impaired in any respect since said seal is applied against the overthickness 2 which in turn is perfectly protected against the electrochemical action arising from the operation of the cell.

Referring again to FIG. 4 or also to the enlarged view of FIG. 5, it can be seen that the cup 13 which is applied against the overthickness 2 is adidtionally provided with a central dome 14 which is intended to come into contact with the central zone of the base of the container 1; said contact, which is added to the contact produced at 15 at the level of the overthickness 2, thus makes it possible to employ the cup as the outside connection to the negative pole of the cell.

In the case of certain uses of dry cells of the type hereinabove described, it may prove necessary to ensure that no electronic bond is liable to be established between the connection to the negative pole of the cell and any other metallic portion of a utilization apparatus.

With this object in mind, a first solution consists in insulating the outer portion of the raised edge of the metal cup 13, the means employed for this purpose being, for example, an enamel varnish.

Another solution consists, in the manner shown in FIG. 6, in making use of a metal cup 17 comprising open portions and in insulating said cup by means of a metallic member 19 which is placed in abutment against the bottom of the container or against the overthickness, said insulation being obtained by interposing an insulating washer 18. In this latter case, the metal disc 19 serves as a connection to the negative terminal; on the other hand, the cup 17 does not have any electronic connection with the container 1 or with its overthickness 2 and is perfectly separated from this latter by means of the case 8 and the insulating washer 18. Any possible contact between the cell and an adjacent metallic object of a utilization apparatus is therefore without danger.

According to yet another arrangement which permits the insulation of the cup and which forms part of the present invention as illustrated in FIG. 7, use is made of a metal cup 20 comprising extensive open portions; the shape of the overthickness 21 which is formed on the base of the metal container 22 as well as the shape of the O-ring seal 23 are accordingly chosen so that, at the time of the crimping operation, the metal cup 20 is applied against only one portion of the seal without coming into contact with the bottom portion of the base of the element or of the member which is applied against this latter. The intermediate space between the edge of the cup and the projecting portion of the base is occupied by that portion of the insulating ring which is forced outwards under the effect of the clamping pressure exerted by the metal cup.

Thus, as a result of the combination of the channel 27 formed in the base of the element with the sealing ring 23 which is held therein and the clamping cup 20, requisite leak-tightness as well as electrical insulation of said cup are simultaneously obtained.

The dry cells which are described in reference to FIGS. 1 to 7 all have a metal container which forms one piece with the overthickness in which a circular channel has been machined.

However, while a container having the shape indicated above can quite readily be formed by extrusion in the case of a metal such as zinc, the same does not apply in the case of other metals such as magnesium and iron, for example. In this case, it is necessary to apply other arrangements such as that which is shown in FIG. 8.

The dry cell according to FIG. 8 is distinguished from the others by the fact that the metal container 24 which serves as anode has the conventional flat base as can easily be formed either by die-stamping or extrusion. However, provision is made beneath said container 24 for another metallic member 25 which forms part of the invention and which has at the peripheral portion thereof an overthickness 26 in which there has been machined a circular channel 27 having a trapezoidal cross-section and a depth of a few millimeters, and in which the O-ring seal 28 is intended to be fitted.

The metallic member 25 will preferably be formed of the same material as the container 24. It will also be an advantage to join the member 25 to the base of the container 24 by electric welding, for example, at a number of different points 29 in such a manner as to obtain a perfect electronic bond.

The assembly of the cell according to FIG. 8 is identical with that which has been explained in reference to FIGS. 1 to 5.

As will also be apparent, the invention is not limited to the examples hereinabove described but could, on the contrary, be provided with a large number of modifications without thereby departing from the scope of the invention.

In particular, it will be noted that the term "dry cell" has been employed to designate an assembly which consists of at least one primary electrochemical element. It thus becomes readily apparent that the invention is applicable in the case of the serial arrangement of two or more elements disposed end to end within the interior of a single case of plastic material, provided that leak-tightness at the bottom of the case is ensured by clamping between the raised edge of a cup and a sealing-joint or so-called O-ring seal carried by the container of the lowermost element.

Furthermore, the examples of dry cells which have been described in reference to FIGS. 1 to 8 relate to dry cells having a metal container which serves as anode. It will be understood that this description is not limitative and that said metal container could simply constitute a current collector and not a soluble electrode. This would be the case in particular in certain types of alkali cells in which the anode is formed by an agglomerate of zinc powder which is applied against a metal collector. The same would apply to other types of alkali cells in which the depolarizing mixture is applied at the periphery of the element against a metal collector, the central electrode in that case constituting the negative terminal.

What I claim is:

1. Dry cell comprising at least one primary electrochemical element of which the external member is a container, said dry cell being enclosed within a case of plastic material and sealed at the top, said dry cell being essentially characterized in that said case is clamped at the bottom portion thereof between the raised edge of a cup and an O-ring seal which bears on the outer periphery of an overthickness formed on the base of said container.

2. Dry cell in accordance with claim 1, characterized in that the O-ring seal is placed within a channel which is formed in the outer periphery of the overthickness.

3. Dry cell in accordance with claim 2, characterized in that the channel has a trapezoidal cross-section.

4. Dry cell in accordance with claim 1, characterized in that the container and the overthickness are formed in one piece.

5. Dry cell in accordance with claim 1, characterized in that the overthickness forms part of a separate metallic member.

6. Dry cell in accordance with claim 5, characterized in that the separate member is joined to the base of the container by spot-welding.

7. Dry cell in accordance with claim 1, characterized in that the cup is applied against the overthickness.

8. Dry cell in accordance with claim 7, characterized in that the cup is provided with an inwardly projecting dome which is applied against the base of the container.

9. Dry cell in accordance with claim 1, characterized in that the cup comprises extensive open portions and is insulated by interposition of a washer from a disc which bears on the overthickness.

10. Dry cell in accordance with claim 1, characterized in that the cup comprises extensive open portions and is in contact only with the case and with the O-ring seal, the height of the overthickness being sufficient to reach at least the level of the open portion of the cup.

References Cited

UNITED STATES PATENTS 2,450,813 10/1948 Reinhardt et al. _____ 136—133

FOREIGN PATENTS 1,097,049 6/1955 France.
1,061,852 7/1959 Germany.
4,512 1882 Great Britain.

ALLEN B. CURTIS, *Primary Examiner.*

WINSTON A. DOUGLAS, *Examiner.*

D. L. WALTON, *Assistant Examiner.*